(12) United States Patent
Erdos et al.

(10) Patent No.: US 10,550,682 B2
(45) Date of Patent: Feb. 4, 2020

(54) PROGRAMMABLE INTEGRATED MEASUREMENT WHILE DRILLING DIRECTIONAL CONTROLLER

(71) Applicant: MicroPulse, LLC, Houston, TX (US)

(72) Inventors: David Erdos, Houston, TX (US); Abraham C. Erdos, Houston, TX (US); Kenneth C. Miller, Houston, TX (US)

(73) Assignee: MicroPulse, LLC., Houston, TX (US)

( * ) Notice: Subject to any disclaimer, the term of this patent is extended or adjusted under 35 U.S.C. 154(b) by 225 days.

(21) Appl. No.: 15/483,789

(22) Filed: Apr. 10, 2017

(65) Prior Publication Data

US 2017/0218745 A1 Aug. 3, 2017

Related U.S. Application Data

(63) Continuation-in-part of application No. 14/920,775, filed on Oct. 22, 2015, now abandoned.

(60) Provisional application No. 62/321,922, filed on Apr. 13, 2016.

(51) Int. Cl.
*E21B 44/00* (2006.01)
*E21B 7/04* (2006.01)
*E21B 47/06* (2012.01)
*E21B 47/024* (2006.01)
*G01V 5/04* (2006.01)
(Continued)

(52) U.S. Cl.
CPC ............... *E21B 44/00* (2013.01); *E21B 7/04* (2013.01); *E21B 47/024* (2013.01); *E21B 47/065* (2013.01); *E21B 47/12* (2013.01); *G01V 5/104* (2013.01)

(58) Field of Classification Search
CPC ........ G01V 11/002; G01V 5/04; E21B 44/00; E21B 47/01; E21B 7/04; E21B 47/065; E21B 47/12; E21B 47/024
See application file for complete search history.

(56) References Cited

U.S. PATENT DOCUMENTS

| 4,989,462 A | 2/1991 | Davis et al. |
| 5,739,431 A | 4/1998 | Petri |
| 5,850,624 A | 12/1998 | Gard et al. |

(Continued)

FOREIGN PATENT DOCUMENTS

| AU | 2014101269 A4 | 11/2014 |
| EP | 1106777 B1 | 6/2001 |

(Continued)

OTHER PUBLICATIONS

Caruso, Michael J.; et al. "Anistropic Magnetoresistive Sensors Theory and Applications." Sensors Magazine, 16(3), 13 pp., 1999.

(Continued)

*Primary Examiner* — Randy W Gibson
*Assistant Examiner* — Gedeon M Kidanu
(74) *Attorney, Agent, or Firm* — Faegre Baker Daniels LLP

(57) ABSTRACT

A programmable integrated measurement while drilling (MWD) system is an integrated, ruggedized, and condensed MWD system configured to enable end-user customizable applications for downhole exploration and drilling. The integrated MWD system integrates a co-processor with a directional controller enabling execution of the end-user customizable applications without interrupting the real-time operations of the directional controller.

21 Claims, 9 Drawing Sheets

(51) Int. Cl.
*E21B 47/12* (2012.01)
*G01V 5/10* (2006.01)

(56) References Cited

U.S. PATENT DOCUMENTS

| | | | |
|---|---|---|---|
| 6,181,138 B1 | 1/2001 | Hagiwara et al. | |
| 6,206,108 B1 | 3/2001 | MacDonald et al. | |
| 6,237,404 B1 | 5/2001 | Crary et al. | |
| 6,315,062 B1 | 11/2001 | Alft et al. | |
| 6,499,545 B1 | 12/2002 | MacGugan | |
| 8,768,647 B1* | 7/2014 | Zaki | G01C 21/16 702/150 |
| 2003/0236627 A1 | 12/2003 | Estes | |
| 2006/0283632 A1* | 12/2006 | Hall | E21B 7/04 175/26 |
| 2007/0032951 A1* | 2/2007 | Tanenhaus | G01C 21/16 702/151 |
| 2007/0056771 A1 | 3/2007 | Gopalan et al. | |
| 2010/0097890 A1* | 4/2010 | Sullivan | E21B 17/028 367/82 |
| 2011/0015862 A1* | 1/2011 | Sato | E21B 47/022 702/6 |
| 2012/0062235 A1 | 3/2012 | Khan et al. | |
| 2012/0221244 A1* | 8/2012 | Georgy | G01C 21/165 701/472 |
| 2013/0043076 A1 | 2/2013 | Larronde et al. | |
| 2013/0126239 A1* | 5/2013 | Panchal | E21B 7/04 175/24 |
| 2013/0334621 A1 | 12/2013 | Classen et al. | |
| 2014/0240140 A1 | 8/2014 | Switzer et al. | |
| 2015/0096805 A1* | 4/2015 | Kruspe | E21B 7/04 175/45 |
| 2015/0218938 A1 | 8/2015 | Weisbeck et al. | |
| 2015/0300152 A1 | 10/2015 | Sasaki et al. | |
| 2015/0362617 A1* | 12/2015 | Munoz | G01V 5/045 702/8 |
| 2017/0114630 A1 | 4/2017 | Erdos et al. | |
| 2017/0122040 A1 | 5/2017 | Derkacz et al. | |

FOREIGN PATENT DOCUMENTS

| | | |
|---|---|---|
| WO | 02082124 A1 | 10/2002 |
| WO | 2014085935 A1 | 6/2014 |

OTHER PUBLICATIONS

International Search Report and Written Opinion issued in PCT/US2016/058251, dated Dec. 15, 2016, 19 pages.
International Search Report and Written Opinion issued in PCT/US2017/026844, dated Jul. 26, 2017, 14 pages.

* cited by examiner

PROGRAMMABLE INTEGRATED MEASUREMENT WHILE DRILLING DIRECTIONAL CONTROLLER

CROSS-REFERENCE TO RELATED APPLICATIONS

This application claims benefit of provisional application 62/321,922, filed Apr. 13, 2016, entitled "Programmable Integrated Measurement While Drilling Directional Controller." This application is a continuation-in-part of U.S. patent application Ser. No. 14/920,775, filed Oct. 22, 2015, entitled "Integrated Measurement While Drilling Directional Controller." Both applications are incorporated herein by reference in their entireties.

TECHNICAL FIELD

The subject matter described herein relates to measurement while drilling (MWD) systems, specifically, programmable MWD systems with integrated sub-systems.

BACKGROUND

Traditional MWD systems (as shown in FIG. 1) are configured to capture measurements of a wellbore inclination from vertical, and also magnetic heading (i.e., measures the trajectory of the wellbore as it is drilled). The Traditional MWD systems include a variety of disparate components across multiple barrels of a drill string, for example, a transmitter 102; a gamma ray sensor 104; sub-system 110 including: strongback 112 (microprocessor unit (MPU) 116, triple power supply (TPS) 114), orientation module 118; and batteries 106 and 108 (e.g., lithium-ion batteries). The above-mentioned components are generally coupled together by at least four connections (i.e., four connections between each component). The sub-system 110 is approximate 60 inches in length. The orientation module 118 can include three accelerometers (e.g., commercial grade sensors), three magnetometers (e.g., fluxgate sensors), and a temperature sensor. The orientation module 118 and the included sensors require power from the TPS (i.e., +5V, +13V, and −13V).

Traditional MWD systems are susceptible to a high degree of failure. The sensors in the orientation module 118 can be easily damaged (or require frequent recalibration) through vibrations during the drilling process. Traditional MWD system generally cannot be used in air or hammer drilling operations. The at least four connections coupling the components also provides multiple points of failure. Traditional MWD systems also consume a large amount of power and require a TPS and at least two batteries for a practical amount of operational time.

Traditional MWD systems are also well suited for common applications in oil and gas exploration and drilling, but are not customizable and programmable by the end-user for fulfilling specific and/or necessary functions. Manufacturers can implement features and changes, but generally only do so when the market demands the features and/or changes. These implemented features and changes are then generally available to all customers, not just the end-user requesting the implementations for fulfilling the specific and/or necessary functions. This general availability to all customers can eliminate the requesting end-user's competitive advantage with regards to the requested specific and/or necessary functions.

SUMMARY

Disclosed herein are systems for integrating and ruggedizing traditional MWD systems to prevent failures and condense the size while maintaining accuracy. Also disclosed herein are systems for programmable integrated MWD systems.

In one aspect of the disclosure, the integrated MWD system includes a directional controller including at least one printed circuit board. The printed circuit board includes at least one accelerometer configured to measure inclination and flow of the integrated measurement device and at least one magnetometer configured to measure a direction of the integrated measurement device. The integrated MWD system can include a second directional controller.

In another aspect of the disclosure, the integrated MWD system can include a transmitter, a gamma ray sensor, and a battery coupled to the directional controller. The integrated MWD system can be master processor unit-less, triple power supply-less, and orientation module-less.

In another aspect of the disclosure, the integrated MWD system can include a magnetometer drive circuit configured to cancel an external magnetic field. The magnetometer drive circuit can include a bridge, offset current loop, and a set/reset loop.

In another aspect of the disclosure, the accelerometers of the integrated MWD system includes can be micro electromechanical systems (MEMS) accelerometers. The magnetometers can be solid-state magnetometer. The magnetometer can be an anisotropic magnetoresistance (AMR) magnetometer.

In another aspect of the disclosure, the directional controller of an integrated MWD system can be configured to control the telemetry from the integrated MWD system.

In another aspect of the disclosure, the directional controller of an integrated MWD system can be configured as a passive logger for a downhole system. The passive logger can facilitate validation of surveys of other directional sensors downhole.

In another aspect of the disclosure, the directional controller of an integrated MWD system can be configured as a high resolution logger for providing logs indicating system failures.

In another aspect of the disclosure, the transmitter of an integrated MWD system can be is configured to transmit one or more directional readings to a remote surface location. The one or more directional readings can be an inclination. The one or more directional readings can be an azimuth. The one or more directional readings from the accelerometers and magnetometers can be raw measurements from the x-axis, y-axis and z-axis.

In another aspect of the disclosure, the directional controller of the integrated MWD system can be equal to or less than 16 inches in length.

In another aspect of the disclosure, the integrated MWD system is configured in a single barrel. The single barrel can be equal to or less than 10 feet.

In another aspect of the disclosure, a programmable integrated measurement while drilling system including a directional controller is disclosed. The directional controller can include a processor, one or more sensors, and a co-processor communicatively coupled to the directional controller by a bus, the co-processor comprising a non-transitory memory storing a custom application. The co-processor can execute the custom application and in response can receive, from the processor, sensor data collected from the one or more sensors (e.g., accelerometer, a magnetometer, and temperature sensor). The co-processor can process the sensor data according to custom application, transmit, to the processor, an output from the custom application. In response to receiving the output the processor can encode and telemeter the output. In some aspects the output can be a bit stream.

In another aspect of the disclosure, the custom application, while processing the sensor data, can be configured to invoke one or more application programming interfaces and manipulate the sensor data according to the custom application and the invoked application programming interfaces. In some aspects of the disclosure, manipulation comprises compressing the sensor data. In some aspects of the disclosure the manipulation includes comparing the sensor data to pre-defined thresholds and in response to the sensor data exceeding one of the pre-defined thresholds generating an alert as the output.

In some aspects of the disclosure, an add-on board can be coupled to the co-processor, the add-on board including one or more third-party sensors. The co-processor can be configured to receive, process, and transmit sensor data received from the add-on board in accordance with the custom application.

In some aspects of the disclosure, a programmable integrated measurement while drilling system is disclosed. The programmable integrated measurement while drilling system can include a first processor configured to receive sensor data from one or more sensors, a second processor configured to execute a custom application, and a non-transitory shared memory partitioned to keep a first portion accessible by the first processor separate from a second portion accessible by the second processor, wherein the second portion storing the custom application. The second processor can execute the custom application, which causes the second processor to receive, from the first processor, the sensor data. The co-processor can process the sensor data according to custom application and transmit, to the first processor, an output from the custom application. In response to receiving the output at the second processor, the first processor can encode and telemeter the output.

In some aspects of the disclosure a method for a processing sensor data from a programmable directional controller is disclosed. The method can include receiving, at a sub-surface directional controller, sensor data and transmitting the received sensor data to a co-processor. The co-processor can execute a custom application, wherein the custom application processes the sensor data. The co-processor can transmit, to the directional controller, an output from the custom application. The directional controller can encode and telemeter the output.

In some aspects of the disclosure, a high temperature customizable downhole tool is disclosed. The high temperature customizable downhole tool can include a first processor configured to operate in real-time, one or more sensors coupled to the first processor and configured to record and send sensor data to the first processor, a second processor coupled to the first processor, and a non-transitory memory coupled to the second processor, the non-transitory memory configured to store a custom application. The second processor configured to execute the custom application, which causes the second processor to receive, from the first processor, the sensor data. The second processor can process the sensor data to determine an output, and transmit the output to the first processor. The first processor, in response to receiving the output can encode and telemeter the output.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Figure 1:
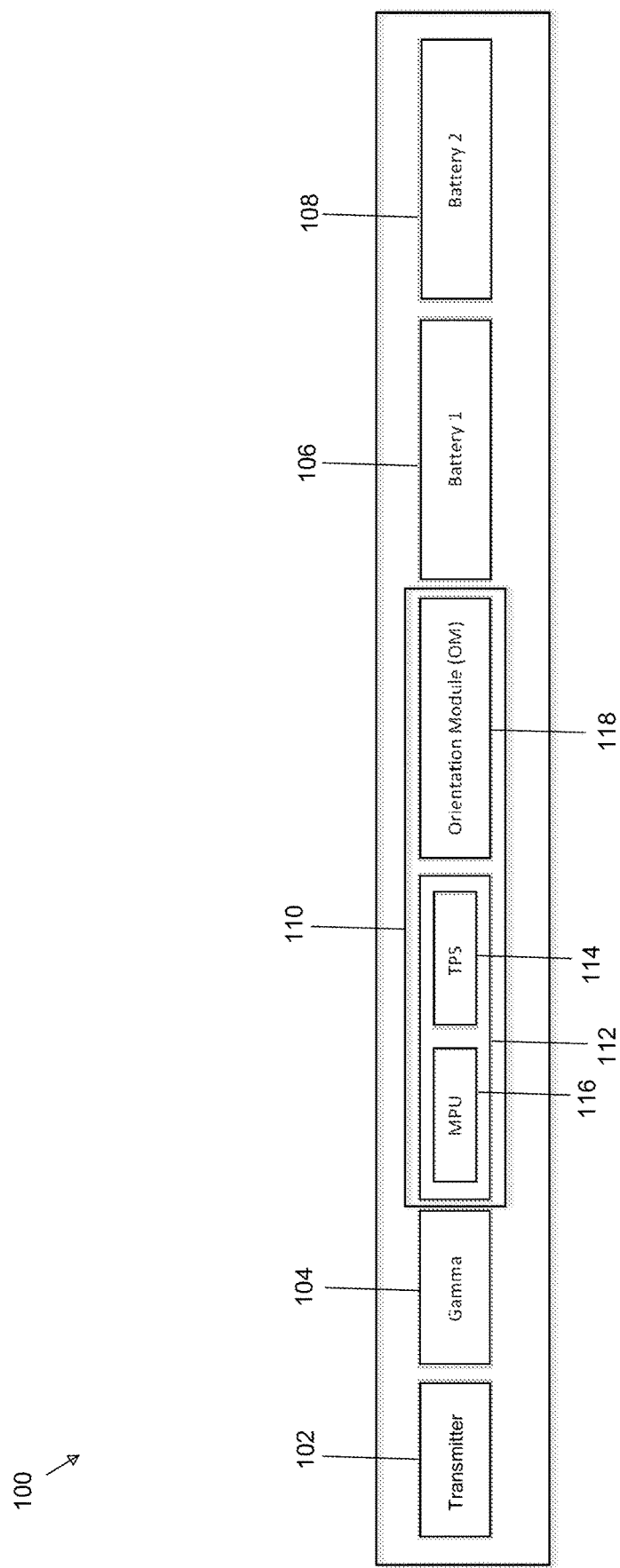
FIG. 1 illustrates a block diagram of an example traditional MWD system.
Figure 2:
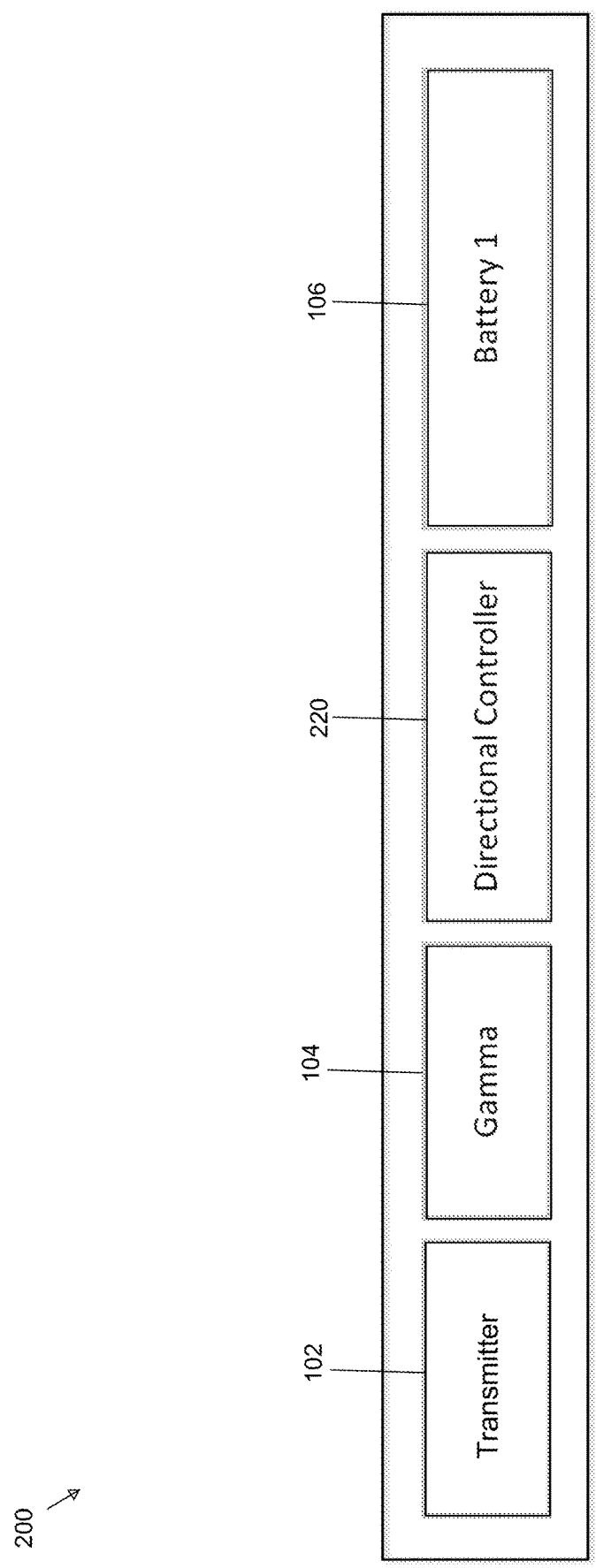
FIG. 2 illustrates a block diagram of an example integrated MWD system.

FIG. 2 illustrates an example integrated MWD system 200. Generally, an integrated MWD system 200 is an integrated, ruggedized, and condensed traditional MWD system that prevents the failures present in the traditional MWD systems while maintaining a high level of accuracy. Integrated MWD system 200 can include a transmitter 102 (e.g., pulser, positive mud pulser, negative mud pulser, acoustic transceiver, electromagnetic transceiver, piezo transceiver, etc.), gamma ray sensor 104 (e.g., proportional gamma ray sensor, spectral gamma ray sensor, bulk gamma ray sensor, resistivity sensor, neutron density sensor, etc.), directional controller 220, and at least one battery 106. Directional controller 220 can replace sub-system 110 of a traditional MWD system (as shown in FIG. 1) by integrating the processor, power supplies and orientation sensors into a single integrated hardware module (e.g., integrated onto a single printed circuit board (PCB)). The directional controller 220 reduces the overall size of an MWD system, reduces the power consumption, increases reliability, and increases the durability of the MWD system.

The integrated MWD system 200 can be enclosed in a single barrel of an MWD system string. In some embodiments, the directional controller 220 can be approximately 16 inches in length. In other embodiments, the directional controller 220 can be a range from 12 inches to 24 inches in length. As previously discussed, the traditional MWD sub-system 110 is approximately 60 inches in length. The reduction in length of the directional controller 220 can increase the reliability and ruggedness of the MWD system by utilizing smaller, more rugged hardware components (e.g., micro electro-mechanical systems and solid-state sensors), eliminating connectors/interconnects, and decreasing the overall length, which increases the rigidity and mechanical ruggedness of the MWD system. The reduction in length of the directional controller 220 also enables the entire integrated MWD system 200 to be enclosed in a single barrel. The single barrel can be retrievable from the drill string.

Traditional MWD systems are equipped with large, commercial grade accelerometers (e.g., aerospace inertial grade accelerometers). The commercial grade accelerometers are highly accurate sensors (e.g., to +/−0.1 degrees). However, commercial grade accelerometers are highly susceptible to failure. Commercial grade accelerometers also require constant recalibration during use downhole. Furthermore, commercial grade accelerometers require a significant amount of power (e.g., TPS, +13V and −13V power source, etc.).

Traditional MWD systems are generally equipped with fluxgate magnetometers. Fluxgate magnetometers are known for their high sensitivity. However, fluxgate magnetometers require a fairly complex driving circuit. Furthermore, fluxgate magnetometers are generally large in size (approximately 1"×1"×0.25"). Traditional MWD require at least two fluxgate magnetometers for proper operation.

In some embodiments, the integrated MWD system 200 can be configured to use micro electro-mechanical systems (MEMS) accelerometers and solid-state magnetometers. The MEMS accelerometers and solid-state magnetometers require less power and fewer voltage rails than the commercial grade sensors, (i.e., TPS 114 is not required in the integrated MWD system 200). The MEMS accelerometers and solid-state magnetometers can provide a more compact MWD system that is more reliable, durable, and consumes less power while still providing the same level of accuracy, as described below.

In some embodiments, the integrated MWD system 200 can include one or more directional controllers 220 to prevent magnetic interference. Generally, an MWD system is enclosed in a non-magnetic collar to prevent magnetic interference from the large amount of steel near the drill bit. However, the bottom of the MWD (i.e., closest to the drill bit) is near the end of the non-magnetic collar, thus, magnetic readings taken closer to the end of the non-magnetic collar can experience magnetic interference. However, obtaining inclination measurements as close to the drill bit as possible is important for accurate positioning of the well. Positioning a second directional controller (i.e., for magnetometer measurements) further from the drill bit and inside the non-magnetic collar can prevent interference with the magnetic measurements. For example, a first directional controller can be positioned closer to the drill bit (e.g., further down hole at the end of a non-magnetic collar) and a second directional controller can be positioned further way from the drill bit (e.g., further up hole within the non-magnetic collar). The first directional controller can measure and transmit inclination values (i.e., calibrated accelerometer values) to the second directional controller. The second directional controller can calculate azimuth values by magnetometer measurements (taken at the second directional controller) and by the received accelerometer measurements from the first directional controller. Thus, reducing any potential magnetic interference with the magnetic measurements.

In other embodiments, there can be magnetic interference from the steel drill pipe at the upper end of the non-magnetic collar and from the mud motor at the lower end of the non-magnetic collar. Magnetic field measurements can be measured at two or more points within the non-magnetic collar (e.g., a first directional controller can measure the magnetic field at a first point within the non-magnetic collar and a second directional controller can measure the magnetic field at a second point within the non-magnetic collar). The measurements at the two or more points can be used to calculate a magnetic gradient. The magnetic gradient can be used to subtract out the magnetic interference above and below the non-magnetic collar. Subtracting out the magnetic interference can enable the use of a shorter non-magnetic collar, while still obtaining accurate magnetic readings (i.e., azimuth). A shorter non-magnetic collar can save in the costs of production and operation, and simplify operations of the MWD system.

Figure 3:
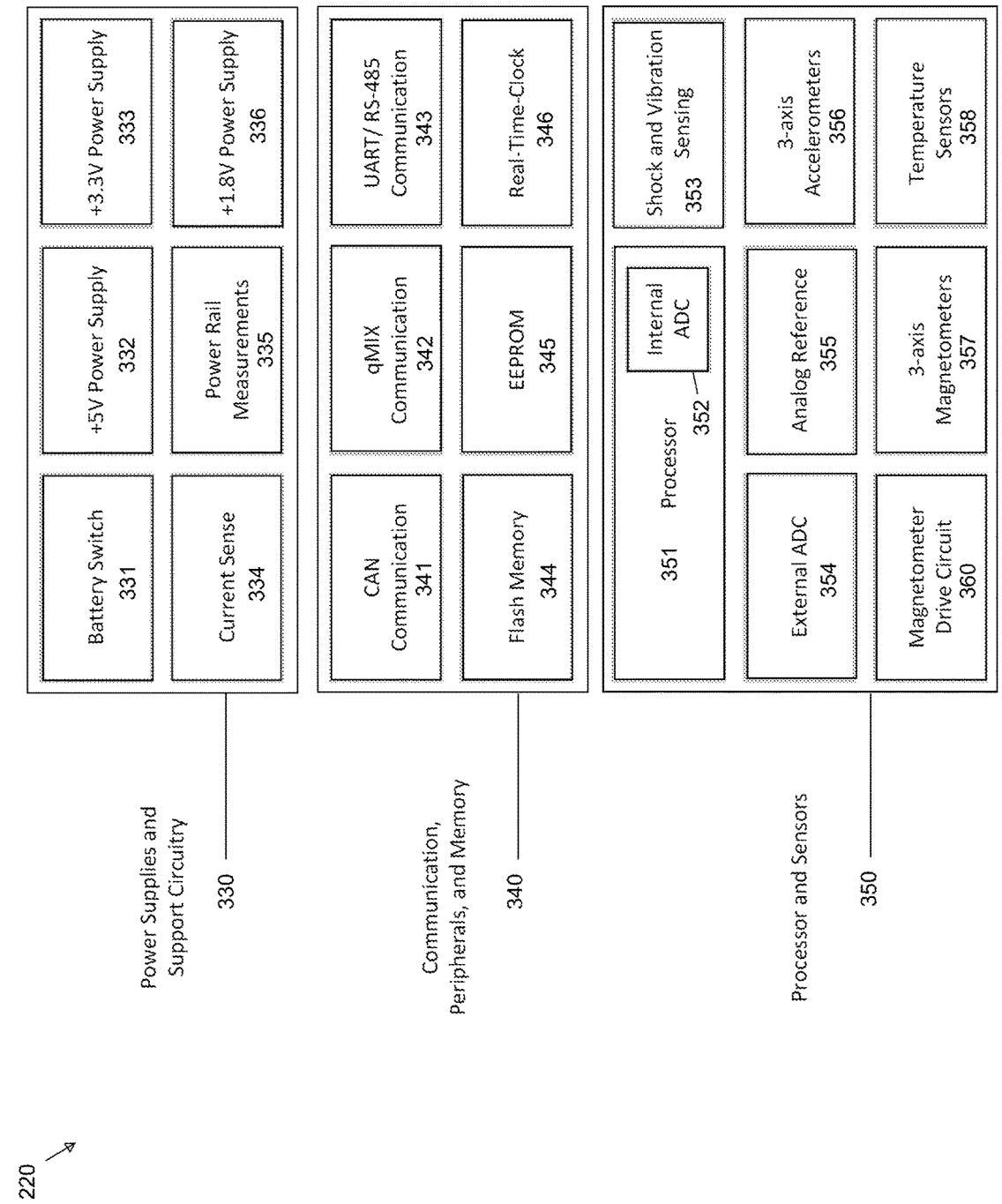
FIG. 3 illustrates a block diagram of an example directional controller of an integrated MWD system.

FIG. 3 illustrates an example directional controller 220. Directional controller 220 can include three sub-systems: power supplies and support circuitry sub-system 330; communication, peripherals, and memory sub-system 340; and processor and sensors sub-system 350. Directional controller 220 can be integrated onto a single PCB. Integrating the sub-systems of the directional controller 220 on a single PCB can avoid unnecessary wired connections (present in the traditional MWD system 100) providing a more reliable and durable MWD system. For example, the integrated MWD system 200 can withstand more vibration (i.e., can be used in hammer drill and air drill operations). In other embodiments, directional controller 220 can be integrated onto one or more PCBs.

Power supplies and support circuitry sub-system 330 can include a battery switch 331, +5V power supply 332, +3.3V power supply 333, +1.8 power supply 336, current sense 334, and power rail measurements 335.

Battery switch 331 can be configured to facilitate sequential depletion of the power sources. For example, battery switch 331 can be configured to switch from a first battery to a second battery, when the first battery is fully depleted. Sequential depletion of the power sources enables the integrated MWD system 200 to operate more efficiently. For example, when the integrated MWD system 200 is used during a drill run, the first battery is used until completely depleted and then, after the first battery is completed depleted the second battery can be used. When a drill run finishes before the first battery is completely depleted and the second battery is fully charged. Thus, the second battery can be used in future drill operations. Alternatively, in an embodiment where both the first and second battery were depleted (at least at some level), both would not be used in future drilling operations resulting in inefficient and more costly drill operations.

The power supplies 332, 333 and 336 are configured to supply power to all of the electronics of the directional controller 220. The different components of the directional controller 220 can require different voltages. Power supplies 333 and 336 can supply power to processor 351. Power supply 333 can supply power to accelerometers 356. Power supply 332 can supply power to the input/output communication modules 341, 342, and 343, shock and vibration sensors 353, the magnetometer drive circuit 360, 3-axis magnetometers 357, the external ADC 354, and temperature sensors 358.

Current sense 334 and power rail measurements 335 can be used for diagnostics purposes. For example, current sense 334 and power rail measures 335 can read the output voltage of the power supplies 332, 333, and 336 and current consumption of the directional controller 220, which can be used for health monitoring and preventative maintenance of the MWD system 200.

In some embodiments, power for operating the integrated MWD system 200 can be generated at sub-system 330 by vibrations captured during drilling operations (e.g., using a vibration generator that converts the vibrations of the drill string into useable power).

Communications, peripherals, and memory sub-system 340 can include a controller area network (CAN) communication 341, qMIX communication 324, UART/RS-485/RS-232 communication 343, a flash memory 334, EEPROM 345, and real-time clock 346.

Controller area network (CAN) communication 341, qMIX communication 324, and UART/RS-485/RS-232 communication 343 are all alternative forms of system communication for integrated MWD system 200. For example, the output of the sensors (e.g., directional readings) can be transmitted from the sensors to the other components of the integrated MWD system 200 by the above-mentioned protocols.

Flash memory 344 and EEPROM 345 can be used to store operational logs of downhole measurements, parameters and configurations. Real-time clock 346 can be configured to provide time-stamps for all measurements, parameters, and configurations recorded. In some embodiments, the measurements, parameters, and configurations can be used to identify system failures (e.g., if the gamma counts spike when shock events or high vibration occurs, that can indicate the gamma is failing, or if the battery voltage drops under heavy vibration, that can indicate a battery failure).

In other embodiments, directional controller 220 can capture directional measurements, which can be stored in flash memory 334 and/or EEPROM 345. In other embodiments, directional controller 220 can measure and log detailed diagnostic information (e.g., system voltages, vibration levels, shock events, gamma radiation levels, etc.) used for troubleshooting system failures. In other embodiments, directional controller 220 can be used as a passive logger (e.g., facilitate validation of the surveys recorded by another directional sensor or MWD system). In other embodiments, directional controller 220 can be used as a high-resolution logger (e.g., capturing and providing logs for use in analyzing and troubleshooting system failures). In other embodiments, directional controller 220 can provide directional readings (e.g., inclination, azimuth, or raw measurements) to other components in the MWD system by serial communication protocol over a serial communication layer (as illustrated in above).

Processor and Sensors sub-system 350 includes at least one processor 351. Processor 351 can include an internal analog-to-digital (ADC) converter 352. The ADC 352 can measure the integrated MWD system 200 voltages (e.g., battery 1 106), the voltage rails (i.e., +5V power supply 332, +3.3V power supply 333, +1.8V power supply 336, etc.), the current sense 334, the shock and vibration accelerometer 353, the temperature sensor 358, and the magnetometer drive circuit 360.

Sub-system 350 can also include, an external ADC 354, analog reference 355, magnetometer drive circuit 360 (illustrated in FIG. 4), one or more 3-axis magnetometers 357, one or more shock and vibration sensors 353, one or more 3-axis accelerometers 356, and one or more temperature sensors 358 (e.g., resistance temperature detector, thermocouple, thermistor, silicon band gap temperature sensor, etc.).

Shock and vibration sensor 353 (e.g., one or more accelerometers) can be in-plane of PCB (and/or perpendicular to the PCB) for providing real-time data to a drill operator. In some embodiments, shock and vibration sensor 353 can provide real-time drilling parameters (e.g., revolutions per minute, stick slip, bit bounce, vibration spectrum, etc.). Shock and vibration sensor 353 can also measure shock and vibration levels stored in failure analysis logs in flash memory 334 and/or EEPROM 345 for future review (e.g., download logs and review at a later time).

Figure 4:
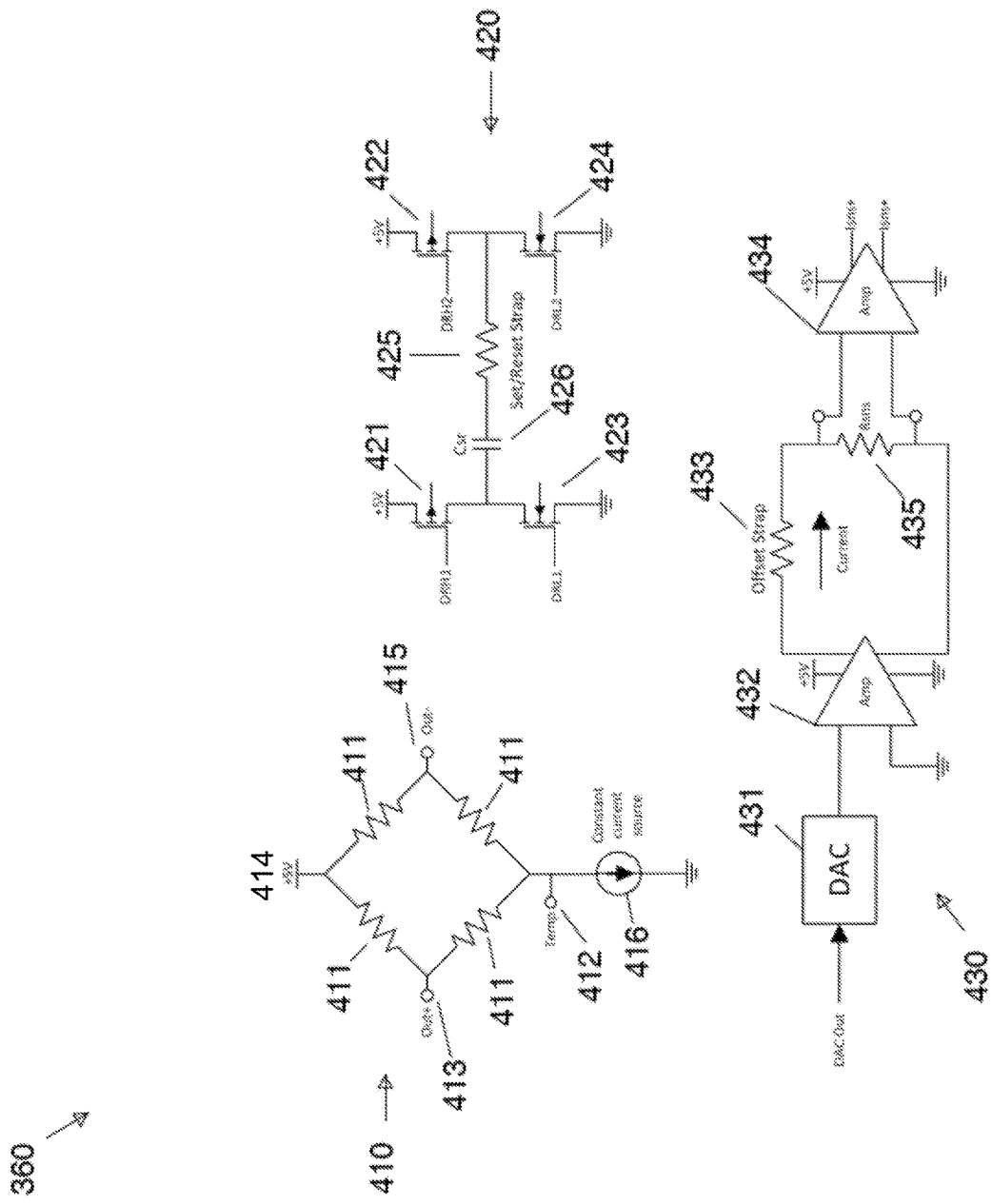
FIG. 4 illustrates a circuit diagram of an example driving circuit for a magnetometer of an example integrated MWD system.

The external ADC 354 can be a high resolution ADC used to derive measurements from the magnetometers 357. In other embodiments, the external ADC 354 can derive measurements of the bridge voltage output and the offset strap current (as illustrated in FIG. 4). Analog reference 355 can provide a reference voltage to external ADC 354 (and internal ADC 352). The analog reference 355 can be a fixed value irrespective of any external conditions (e.g., the load on a device, power supply variations, temperature changes, passage of time, etc.). The analog measurements recorded by external ADC 354 (and internal ADC 352) can be referenced to the analog reference 355 to detect fluctuations in voltage.

Figure 5:
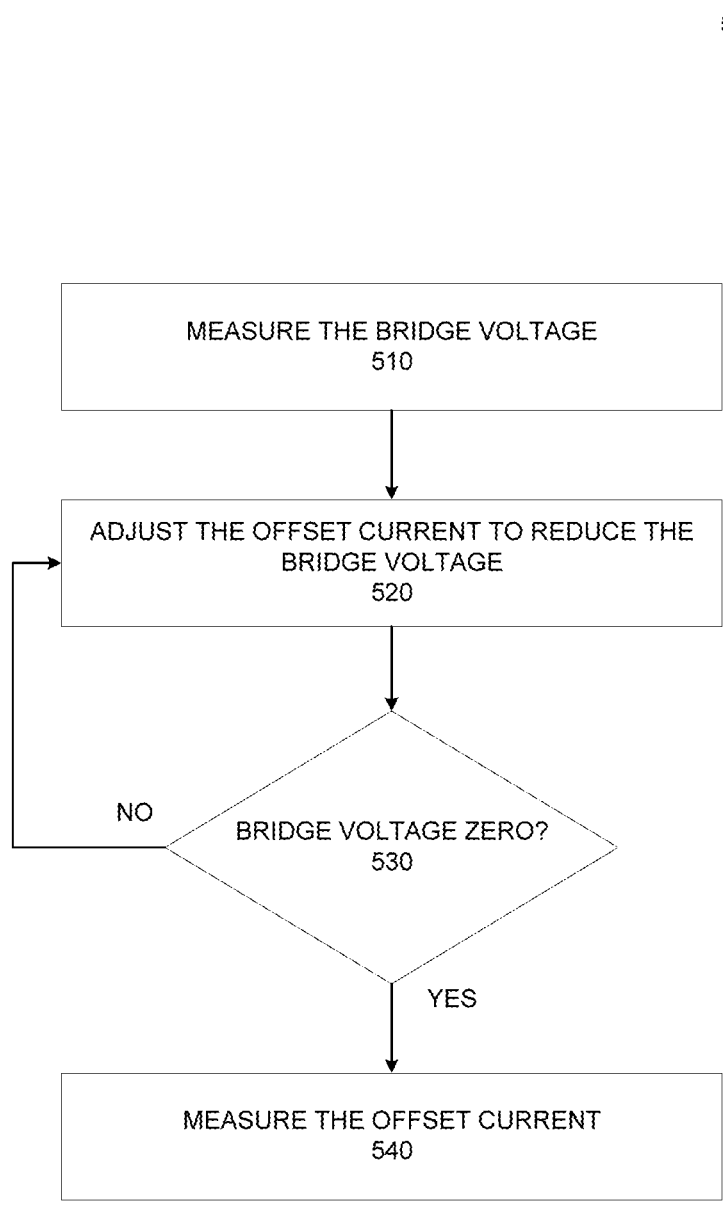
FIG. 5 illustrates a flowchart of an example method of an example magnetometer drive circuit.

Temperature sensors 358 can monitor the temperature of integrated MWD system 200. In other embodiments, the temperature sensors 358 can perform temperature compensation of the magnetometer 357 outputs. However, the magnetometer 357 outputs can be temperature compensated based off of a voltage measurement taken directly from the magnetometers 357, which can change linearly with temperature (as shown in FIG. 4 and FIG. 5).

The one or more 3-axis accelerometers 356 can be used to measure inclination and flow. For example, accelerometers 356 can be MEMS accelerometers, quartz flex servo accelerometers, etc. In one embodiment, directional controller 220 can include 11-axis of accelerometers (i.e., two 3-axis accelerometers for measuring inclination, two shock and vibration accelerometers 353, and one 3-axis accelerometers for measuring flow). In other embodiments, there can be two or more shock and vibration accelerometers. In other embodiments, there can be two or more 3-axis accelerometers for measuring inclination. In other embodiments, there can be one or more 3-axis accelerometers for measuring flow.

In some embodiments, transmitter 102 can telemeter inclination measurements (e.g., measured by 3-axis accelerometers 356 and calculated by directional controller 220) to the surface. In other embodiments, transmitter 102 can telemeter raw data to the surface. For example, a 3-axis accelerometer can measure readings on the x-axis, y-axis, and z-axis. The raw readings of these axes can be telemetered (i.e., individually) to the surface where the inclination or any corrections can be processed. In some embodiments data transmitted by transmitter 102 can be encoded and formatted by directional controller 220.

In some embodiments, non-commercial accelerometers 356 (e.g., MEMS accelerometers) can be less sensitive than commercial grade accelerometers (in orientation module 118) and can have potential non-linearities in the readings at certain orientations. In order to compensate for the sensitivity and potential non-linearities, the non-commercial accelerometers 356 can be orientated at different angles on the PCB to enable the non-commercial accelerometers 356 to obtain accurate readings at all orientations of the integrated MWD system 200. For example, a first accelerometer can be oriented at 0 degrees and a second accelerometer can be oriented at 45 degrees relative to first (or other) accelerometers. The offset orientation enables the accelerometers to obtain highly accurate readings (i.e., equivalent to the commercial grade accelerometers) regardless of the orientation of the integrated MWD system 200. For example, when the MWD system is substantially vertical, substantially horizontal, at 45 degrees, etc. The accuracy is achieved by always having one accelerometer at a substantially optimal reading orientation (e.g., during directional drillings). Thus, the orientation of the non-commercial accelerometers 356 enables a substantially similar level of accuracy (+/−0.1 degree) as the commercial grade accelerometers.

In some embodiments, the accelerometers can detect flow. For example, a 3-axis accelerometer can detect vibrations of mud flow around the integrated MWD system 200. The detection of flow can determine the operational status of the drill string. For example, when the accelerometer detects flow the drill is operational and when the accelerometer does not detect flow the drill is currently not operational. In some embodiments, when flow is detected, the transmitter 102 can commence transmitting to enable communication between the downhole tools and the driller operator.

The magnetometer drive circuit 360 and one or more magnetometers 357 can be used to determine the direction of the magnetic vector. Accurate magnetic readings are required to determine the direction and location of a well. The magnetometer drive circuit 360 (as illustrated in FIG. 4) can be an electrical circuit configured to measure the magnetometer output, and also to control the magnetometers in a closed loop configuration (e.g., to control the current in the offset strap to drive the bridge output to zero). In some embodiments, the magnetometer can be solid-state magnetometers, anisotropic magnetoresistance (AMR) magnetometers, fluxgate magnetometers, giant magnetoresistance magnetometers, tunneling magnetoresistance elements, gain magneto resistance elements, etc.

In some embodiments, transmitter 102 can telemeter the direction of the magnetic vector (e.g., measured by magnetometers 357 and calculated by directional controller 220) to the surface. In other embodiments, transmitter 102 can telemeter raw data to the surface. For example, a 3-axis magnetometer 357 can measure readings on the x-axis, y-axis, and z-axis. The raw readings of these axes can be telemetered (i.e., individually) to the surface where the direction of the magnetic vector or any corrections can be processed. In some embodiments data transmitted by transmitter 102 can be encoded and formatted by directional controller 220.

The inclination of the accelerometers and the direction of the magnetic vector of the magnetometers can be used to calculate a compass heading (i.e., azimuth). The compass heading can be used to determine the direction of the MWD system. The direction can be used to determine the orientation of the drill string for use in directional drilling.

FIG. 4 illustrates a circuit diagram of an example magnetometer drive circuit 360 with one or more magnetometers. Magnetometer drive circuit 360 can include three sub-circuits: bridge 410, set/reset strap 420, and offset current strap 430. In some embodiments, the magnetometers cannot operate properly (i.e., obtain reliable readings) at high temperatures (e.g., approximately 350 F). For example, in a high temperature environment the output of the magnetometer can become unreliable (i.e., non-linear). When the output of the magnetometer is unreliable, the orientations calculated will not be accurate enough for drilling operations. In some embodiments, the magnetometer drive circuit 360 can be configured to enable the magnetometers to operate at high temperatures by using closed loop magnetic field sensing, constant-current drive of the magnetometer bridge, oversampling of sensors, utilization of a set/reset straps, and taking temperature measurement directly from the bridge.

The bridge 410 (e.g., Wheatstone bridge, resistor bridge, measurement bridge, etc.) can be configured to measure an unknown electrical resistance change (e.g., measured at out+ 413 and out− 415), created by the applied magnetic field. The bridge 410 can include a plurality of resistors 411. In some embodiments, magnetometers 357 can include resistors 411. For example, the magnetometers 357 (e.g., AMR magnetometers) can include elements (e.g., resistors 411) assembled in the bridge 410. In this configuration, the resistance of the elements change when an external magnetic field is applied. The bridge 410 can also include out+ 413, out− 415, and temperature output 412, which can input to processor 351 (to internal ADC 352). The bridge 410 can also include a +5V input 414.

In some embodiments, as the temperature of the integrated MWD system 200 increases, the resistance of the bridge increases (along with the voltage across the bridge). While a constant voltage can be commonly applied to the bridge to obtain a voltage output, maintaining a constant current through the bridge can further reduce the temperature dependence of the voltage output. For example, by placing a constant current source 416 on the low side of the bridge.

The set/reset strap 420 can be configured to negate hysteresis and offset errors of the magnetometers 357. In some embodiments, the set/reset strap 420 can surround the bridge resistors 411. In some embodiments, magnetometers 357 can include resistor 425. For example, the magnetometers 357 (e.g., AMR magnetometers) can include elements (e.g., resistor 425) assembled in the set/reset strap 420. In some embodiments, set/reset strap 420 can include P-channel field-effect transistors 421 and 422 and N-channel field-effect transistors 423 and 424 (e.g., running in depletion-mode). The field-effect transistors 421-424 can receive (i.e., as input at the gate) output from processor 351. In some embodiments, set/reset strap 420 can also include capacitor 426.

In some embodiments, to eliminate or negate hysteresis and offset errors, a large current pulse can be provided through the set/reset strap 420 (driven by the magnetometer driver circuit 360) causing the direction of sensitivity to be toggled and reset. In some embodiments, the set/reset strap 420 can be operated by sending positive and negative current pulses through resistor 425; with a positive current pulse across 425, the bridge 410 becomes sensitive to a magnetic field in one direction and with a negative going current pulse the bridge 410 becomes sensitive to a magnetic field in the opposite direction. Magnetometer 357 readings from the bridge 410 (i.e., at out+ 413 and out− 415) can be taken after both set and reset pulses. The corrected bridge measurement is then taken as the difference between the measurement taken after the positive going current pulse and the measurement taken after the negative going current pulse. The offset and gain errors of the magnetometers 357 can be removed and hysteresis can be eliminated by frequently (e.g., multiple times a second, 125 Hz, etc.) providing a set and reset pulse to the bridge 410.

In other embodiments, set and reset pulses can be sent to the set/reset strap 420. A small amount of zero-mean Gaussian noise can be added to the measurement, since the magnetometer 357 do not reset to the same sensitivity in every instance. The measurement can then be oversampled and averaged, increasing the overall measurement resolution and signal to noise ratio.

In some embodiments, the offset current strap 430 can surround the bridge resistors 411, enabling current to be driven through the offset current strap 430, which can cancel out any external magnetic field. In some embodiments, magnetometers 357 can include resistor 433. For example, the magnetometers 357 (e.g., AMR magnetometers) can include elements (e.g., resistor 433) assembled in the offset current strap 430. In some embodiments, offset current strap control 430 can include a digital-to-analog converter (DAC) 431 configured to receive an output from processor 351. The DAC 431 can be serially connected to amplifier 432. The amplifier 432 can then connected to resistor 433 to form offset current strap control 430. The offset current strap 430 can also include resistor 435 connected in parallel to amplifier 434, which outputs a voltage proportional to the current passing through 435 to the external ADC 354 which is connected to the processor 351.

In some embodiments, to enable operation of the magnetometers 357 in closed loop mode, a voltage measurement of the bridge 410 can be determined. When the voltage measure is not zero, the current of the offset current strap 430 can be controlled to drive the bridge 410 voltage to zero (i.e., by the magnetometer drive circuit 360). A measurement of the magnetic field is directly proportional to the current required to nullify the voltage measurement. The offset current can then be measured directly and configured as the magnetic field reading. Driving the voltage of the bridge 410 to zero (i.e., controlling the magnetometers 357) can reduce the magnetometer 357 temperature dependent gain error.

In some embodiments, the temperature dependence of the bridge 410 resistance is linear. The voltage across the bridge 410 (e.g., the difference between the voltage reading at temp 412 and +5V 414) can be used as a temperature measurement of the magnetometer 357. The temperature measurement can be used to perform a temperature compensation of the magnetometer readings. The compensation can provide that the temperature reading has no lag or offset and is proportional to the magnetometer temperature. This process can enable very accurate temperature compensation of the magnetometer readings.

The method illustrated in FIG. 5 is provided by way of example as there are a variety of ways to carry out the method. Additionally, while the example method is illustrated with a particular order of steps, those of ordinary skill in the art will appreciate that FIG. 5 and the steps illustrated therein can be executed in any order that accomplishes the technical advantages of the present disclosure and can include fewer or more steps than illustrated.

Each step shown in FIG. 5 represents one or more processes, methods or subroutines, carried out in example method. The steps illustrated in FIG. 5 can be implemented in a system illustrated in FIG. 3 and FIG. 4.

FIG. 5 illustrates a flowchart of an example method 500 for magnetometer drive circuit 360. Method 500 can begin at step 510. At step 510 the voltage of bridge 410 can be measured (e.g., the voltage difference between out+ 413 and out− 415). In some embodiments, when the voltage measured is zero the method 500 can end. In some embodiments, when the voltage measured is greater (or less) than zero an external magnetic field can be present. The external magnetic field can affect the operation of the magnetometers. When the voltage is greater (or less) than zero, the method 500 can proceed to step 520.

At step 520, the offset current can be adjusted to reduce the measured voltage of bridge 410, this is attained through cancellation of the external magnetic field by applying a local magnetic field with the opposite direction. For example, offset current strap 430 can be adjusted (e.g., processor 351 can control DAC 431 to output specific voltages to adjust the current through resister 433) to create a magnetic field with the same magnitude but opposite direction, relative to the externally applied field (e.g. earth's magnetic field), around the bridge 411, resulting in the output voltage of bridge 410 being zero. When the offset current has been adjusted the method 500 can proceed to step 530.

At step 530, method 500 can measure the voltage of bridge 410. When the voltage of bridge 410 is greater than or less than zero, method 500 can return to step 520. When the voltage of bridge 410 is approximately zero, the method 500 can proceed to step 540.

At step 540, method 500 can measure (e.g., the voltage measured across resister 435, amplified by amplifier 434 and transmitted to external ADC 354) the offset current at offset current strap 430. In some embodiments, the offset current can correspond proportionally to the externally applied magnetic field. When the offset current is measured the method 500 can end.

Figure 6:
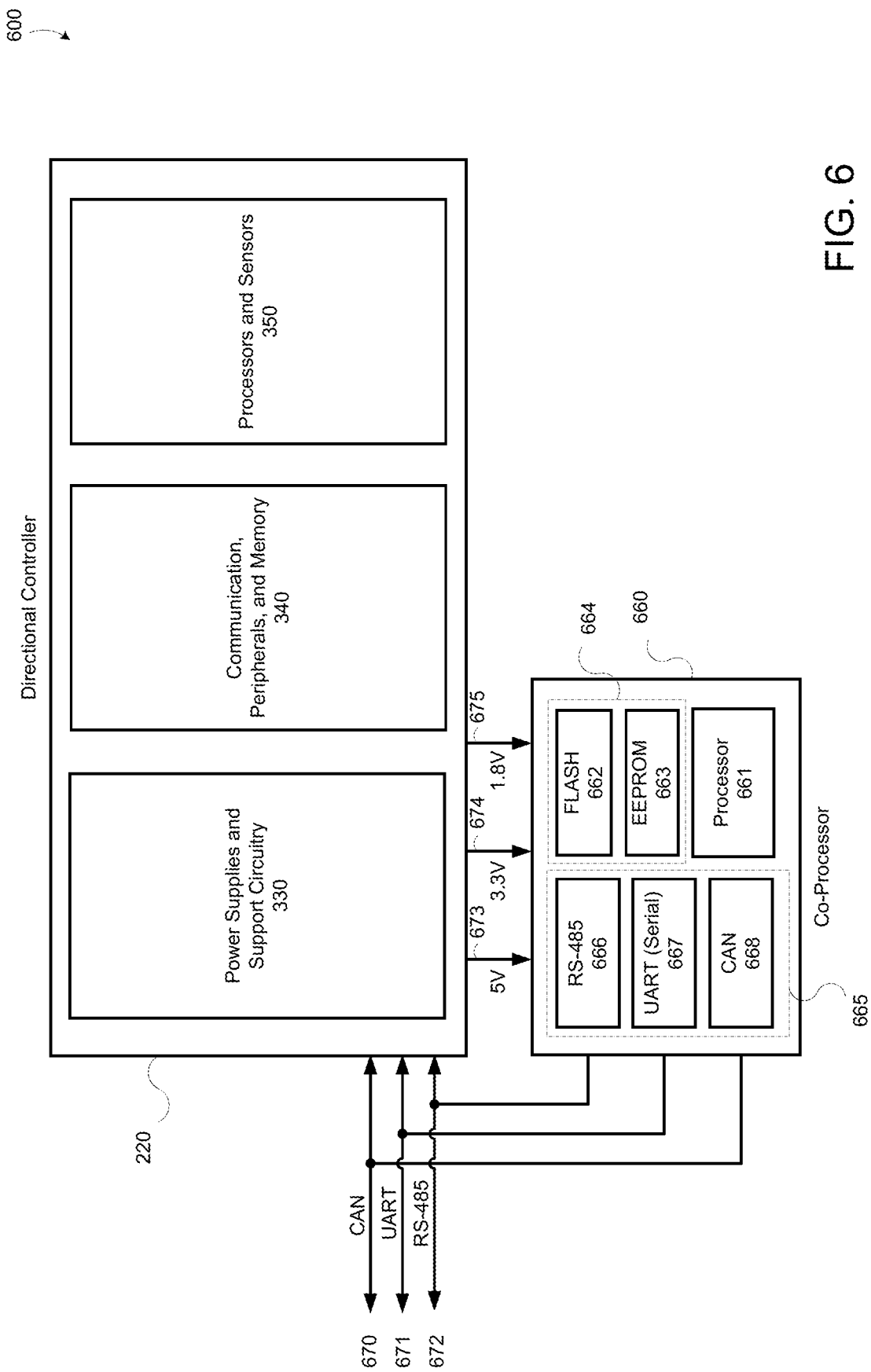
FIG. 6 illustrates a block diagram of an example hardware layer of programmable integrated MWD system.

FIG. 6 illustrates a block diagram of an example hardware layer of programmable integrated MWD system 600. Programmable integrated MWD system 600 can include directional controller 220 (as shown in FIG. 2 and FIG. 3) and co-processor 660. Co-processor 660 can include one or more processors 661, memory sub-system 664, and communication sub-system 665. Memory sub-system 664 can include one or more flash memory 662 and/or EEPROM 663. Communication sub-system 665 can include at least one of input/output communication modules RS-485 666, UART 667, and/or CAN 668. Co-processor 660 can communicatively couple with directional controller 220 through communication sub-system 665 by one or more buses (e.g., CAN bus 670, UART bus 671, RS-485 bus 672). For example, the input/output communication modules of co-processor 660 (e.g., RS-485 666, UART 667, CAN 668, etc.) can communicatively coupled by the one or more buses to the input/output communication modules of directional controller 220 (e.g., RS-485/UART 334, CAN 341, etc.). In one example, co-processor 660 can request data from directional controller 220. Directional controller 220 can transmit the requested data to co-processor 660 by the one or more buses. In other examples, directional controller 220 can broadcast data periodically (e.g., battery voltages every minute), or upon the occurrence of an event (e.g., when the flow line toggles high).

Co-processor 660 can be powered by power supplies and support circuitry 330 (e.g., +5V power supply 332, +3.3V power supply 333, +1.8V power supply 336) through one or more power buses (e.g., 5V bus 673, 3.3V bus 674, 1.8V bus 675, etc.). Co-processor 660 can also include general purpose input/output (GPIO) pins (not shown). In some examples, GPIO pins can externally accessible to enable co-processor 660 to control MWD system 600.

In some embodiments, the hardware of co-processor 660 can be customizable (e.g., according to the end-user specifications). For example, co-processor 660 can include application specific variants (e.g., at least the minimum hardware required to adequately execute the end-user application and its corresponding functions). The application specific variants can include minimum processing requirements, memory requirements, input/outputs, etc. Co-processor 660 can also include (e.g., be connected with) one or more add-on boards (not shown). The following, non-exclusive list sets forth examples of add-on boards: motor driver, solenoid driver, pressure sensor inputs, analog inputs, general purpose input/outputs (GPIO), pulse width modulation (PWM) inputs/outputs, voltage translation, communication bus translation, additional accelerometers sensors, additional magnetometer sensors, additional temperature sensors, additional shock and vibration sensors, third-party sensors, etc.

In some embodiments, co-processor 660 can be integrated into processor 351 (e.g., when processor 351 includes enough computing power to handle the timing requirements of the directional controller 220 and the execution of programmable code).

Co-processor 660 can be configured to store and execute programmable code. For example, an end-user of programmable integrated MWD system 600 can develop programmable code (e.g., end-user custom applications) using co-processor framework 790 (shown in FIG. 7) to be stored in memory and executed at co-processor 660 (e.g., flash memory 662, EEPROM 663, processor 661), separate from directional controller processor 351. The programmable code can be executed separate from directional controller processor 351 in order to preserve the timing operation of processor 351 (e.g., preserving real-time operation) and security of source code of directional controller 220. For example, directional controller 220 receives and processes sensor readings in real-time. In order to effectively and efficiently process the sensor readings in real-time, the timing (e.g., cycles) of processor 351 is critical. Storing and executing user programmable code on processor 351 can interrupt the timing of processor 351 causing resource collisions. Separating processor 351 and co-processor 660 prevents potential resource collisions. For example, by executing end-user custom applications on co-processor 660.

The programmable code can be stored separate from directional controller memory sub-system 340 in order to preserve security of source code of directional controller 220. For example, user programmable code can be stored in flash memory 662 or EEPROM memory 663. Storing the source code and user programmable code separate can prevent corruption of the source code.

Figure 7:
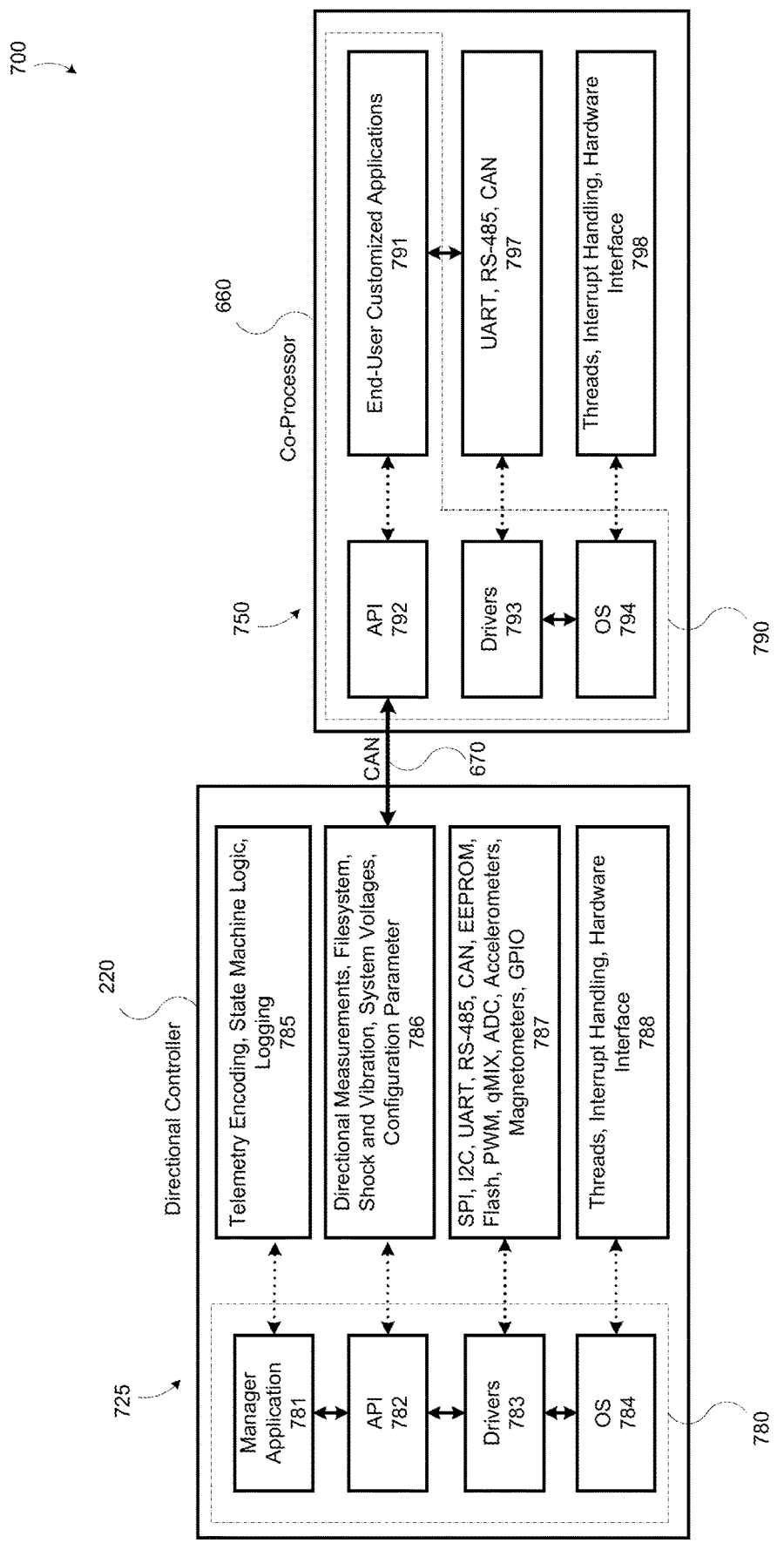
FIG. 7 illustrates a block diagram of an example firmware layer of programmable integrated MWD system.

FIG. 7 illustrates a block diagram of an example firmware layer of programmable integrated MWD system 700. The firmware layer can include a directional controller firmware layer 725 and a co-processor firmware layer 750. The firmware layers (725, 750) can provide a framework (e.g., operating system, filesystem, peripherals, sensors, application programming interfaces, etc.) for an end-user to develop custom applications as needed or required. For example, an end-user can access all measurements from the sensors of the directional controller, control the input/outputs of the directional controller, and execute custom applications on the co-processor to process and manipulate the measurements and input/outputs.

Directional controller firmware layer 725 can include a directional controller framework 780 including, manager application 781, application programming interfaces (API) 782, drivers 783, and operating system 784.

Operating system 784 can be a real-time operating system (e.g., capable of processing data as it is received, without buffering delays). Operating system 784 can be configured to manage low-level operations 788 of processor 351 (e.g., thread management, interrupt handlings, hardware interfaces, etc.). Operating system 784 can call a plurality of drivers 783 for communicating with the hardware components 787 of directional controller 220 (see FIG. 3). The drivers 783 can provide a software interface to the hardware components 787 (e.g., UART/RS-486 communication 343, CAN communication 341, EEPROM 345, 3-axis accelerometers 356, etc.). For example, operating system 784 can be configured to receive and store measurement readings from 3-axis accelerometer 356. Operating system 784 can receive the readings by a communication bus (e.g., CAN 670, UART 671, RS-485 672, etc.) from 3-axis accelerometer 356 through an accelerometer driver of drivers 783. In response to receiving the readings, operating system 784 can store the readings in flash memory 344 through a memory driver of drivers 783.

Manager application 781 can run (e.g., execute) a plurality of different processes, sub-applications, or routines 785 (e.g., telemetry encoding, state machine logic, logging, etc.). Manager application 781 can execute these processes 785 by using API 782 (e.g., by calling libraries or functions within the API, etc.). API 782 can include a plurality of routines, protocols, libraries, functions, or tools 786 for interacting with directional controller 220 (e.g., directional measurements, file system, shock and vibration measurements, system voltages, configuration parameters, etc.). For example, API 782 can invoke a process to communicate with hardware components 787 of directional controller 220, utilizing one or more drivers 783.

Co-processor firmware layer 750 can include co-processor framework 790 including, custom application 791, application programming interfaces (API) 792, drivers 793, and operating system 794.

Operating system 794 can be a real-time operating system (e.g., capable of processing data as it is received, without buffering delays). In some examples, operating system 794 is equivalent to operating system 784 of directional controller 220. In other examples, operating system 794 does not operate in real-time. In other examples, operating system 794 is a reduced capacity operating system (i.e., from operating system 784). Operating system 794 can be configured to manage low level operations 798 of processor 661 (e.g., thread management, interrupt handlings, hardware interfaces, etc.). Operating system 794 can call a plurality of drivers 793 for communicating with the hardware components 797 of co-processor 660 (see FIG. 6). The drivers 793 can provide a software interface to the hardware components 787 (e.g., memory 662, RS-485 666, UART 667, CAN 668, etc.). For example, operating system 794 can be configured to receive and process measurement readings from directional controller 220. Operating system 794 can receive the readings by CAN bus 670 through CAN communication 668 utilizing a CAN driver of drivers 793. In other embodiments, operating system 794 can receive the readings by UART 667 and/or RS-485 666. In response to receiving the readings, operating system 794 can process the readings according to custom application 791.

Custom application 791 can run (e.g., execute) a plurality of different user customizable applications (e.g., applications designed and developed by the user of directional controller 220). Custom application 791 can execute the custom applications by using API 792 (e.g., by calling libraries or functions within the API, etc.). In some example, API 792 is equivalent to API 782 of directional controller 220. In other examples, API 792 is a subset of API 782. In other examples, API 792 can include different libraries or functions than API 782. API 792 can include a plurality of routines, protocols, libraries, functions, or tools for interacting with data received from directional controller 220 (e.g., accelerometer readings, shock and vibration readings, temperature readings, etc.). For example, API 792 can receive sensor data from directional controller 220, and in response can compress the sensor data and transmit back to directional controller 220 for encoding and telemetering to the surface.

In other examples, the API 792 can log received data (e.g., from custom sensor, third-party sensor, etc.) or log custom calculations (e.g., from custom application). The directional controller includes a filesystem the co-processor (and API 792) can use to store logs (e.g., write data). Log entries can be logged on the directional controller by CAN, UART, or RS-485 commands (e.g., over the buses). The log entries can be time stamped by a real-time clock 346 and can be downloaded from the memory at a later point in time (e.g., on the surface, downhole, etc.). In some examples, the filesystem can be on memory sub-system 340 or 664.

In other examples, the co-processor can interface with a second directional controller, the associated sensors, and/or third-party sensors. The co-processor can acquire directional measurements from the second directional controller, and encode the measurements to be telemetered and/or logged by the first directional controller. For example, in the event that the quality of the directional measurements from the first directional controller are not sufficient for the custom application, the customer can use a second directional controller (or alternatively, third-party directional sensors (e.g., accelerometer, magnetometer, pressure sensor, temperature sensors, shock and vibration sensor, etc.)) for obtaining the required quality.

In other examples, the co-processor can be integrated into the processor of the directional controller (e.g., through a high capacity processor). The memory of the directional controller can also be partitioned and blocked to separate the memory for the functionality of the directional controller from the end-user custom application.

In other examples, the end-user custom application can be a script configured to be executed by the manager application 781. Utilizing a scripting language enables development to be performed at a higher level, opposed to a lower level code of a processor (e.g., making development easier on the end-user). The script can be loaded in the memory of the directional controller and executed by the processor (e.g., running the manager application 781).

In other examples, the end-user custom applications can run on the processor of the directional controller at a user-level. The user-level is a lower priority than the manager-level (e.g., manager application 781). The higher priority manager-level threads would supersede the user-level threads (e.g., end-user custom application) ensuring the timing of the processor is kept in real-time.

Figure 8:
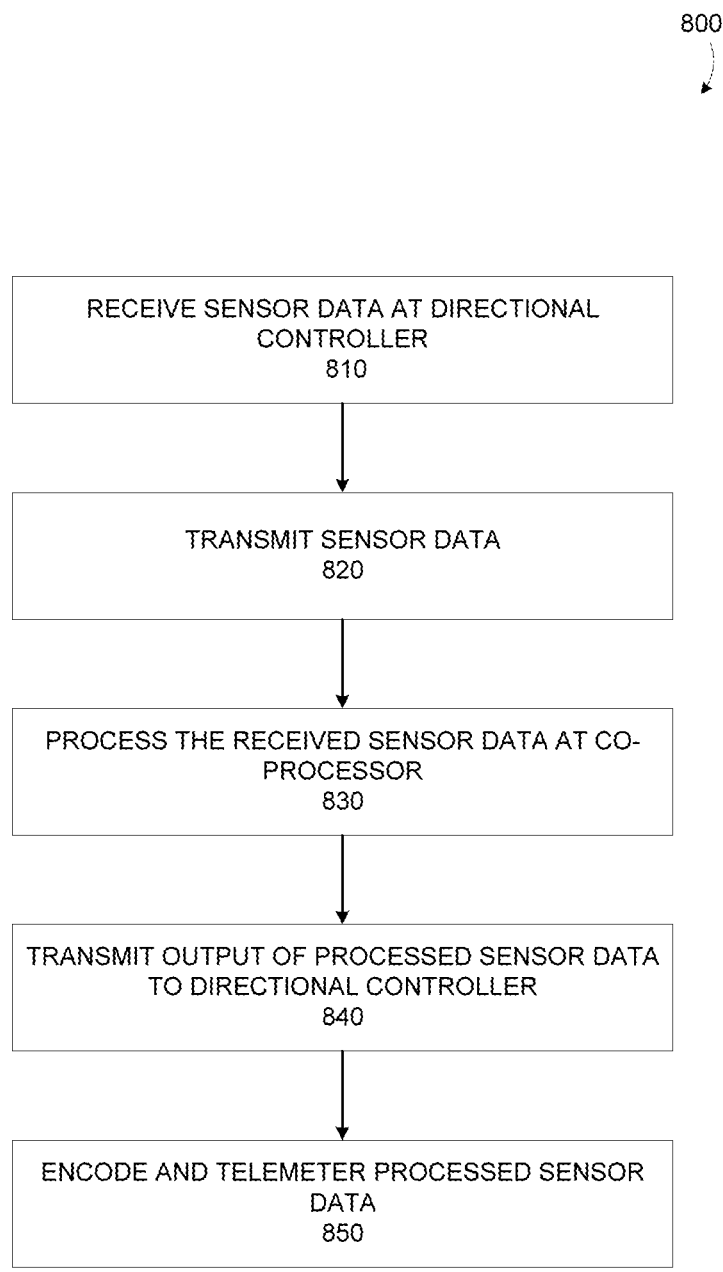
FIG. 8 illustrates a flowchart of an example method of programming an integrated MWD system.

The method illustrated in FIG. 8 is provided by way of example as there are a variety of ways to carry out the method. Additionally, while the example method is illustrated with a particular order of steps, those of ordinary skill in the art will appreciate that FIG. 8 and the steps illustrated therein can be executed in any order that accomplishes the technical advantages of the present disclosure and can include fewer or more steps than illustrated.

Each step shown in FIG. 8 represents one or more processes, methods or subroutines, carried out in example method. The steps illustrated in FIG. 8 can be implemented in a system illustrated in FIG. 6 and FIG. 7.

FIG. 8 illustrates a flowchart of an example method 800 for executing a custom application. Method 800 can begin at step 810. At step 810, a processor can receive sensor data. For example, processor 351 of directional controller 220 can receive sensor data from one or more sensors (e.g., 3-axis accelerometers 256, shock and vibration accelerometers 353, 3-axis magnetometers 357, temperature sensors 358, etc.). In some examples, sensor data can be received at pre-determined intervals. In other examples, sensor data can be received at the time it is captured by the sensors (e.g., real-time). Step 810 can be repeated (e.g., when new sensor data is captured, at the next interval, etc.).

At step 820, the processor can transmit the sensor data, which can be received by a co-processor. For example, processor 351 can transfer the sensor data to processor 661 of co-processor 660. Processor 661 of co-processor 660 can receive the sensor data. In some examples, processor 351 can transfer the sensor data in real-time (e.g., when it is received at processor 351). In other examples, processor 351 can transfer the sensor data in pre-determined intervals (e.g., batches).

At step 830, the co-processor can process the received sensor data. For example, processor 661 can execute a custom application 791 to manipulate and/or process the received sensor data. The following, non-exclusive list sets forth examples in a manner in which custom application 781 can manipulate and/or process the received sensor data: (1) the custom application can compress the sensor data for encoding and telemetering to the surface; (2) the custom application can analyze the sensor data specific to user defined tasks (e.g., exceeding threshold values, errors, warnings, etc.); (3) the custom application can translate readings from external sub-systems or sensors in the MWD system and send them to the directional controller for telemetry. For example, by reading from an external sensor or sub-system using RS-485, interpreting the readings, and sending the interpreted readings to the directional controller for telemetry; (4) the custom application can receive sensor measurements (e.g., directional measurements) from the directional controller and apply corrections to the received measurements to compensate for errors or system characteristics downhole; (5) the custom application can monitor the health the directional controller sensors (e.g. gamma, resistivity tools, etc.), store (e.g., log) the health status data at the directional controller and/or telemeter the health status data by sending the health status data to the directional controller for telemetering/encoding to the surface; (6) the customer application can actuate the GPIO (or other outputs of the co-processor) based on predetermined (or predefined) conditions. For example, the co-processor can periodically poll the inclination (e.g., recorded by the sensors), and then when the polling data reaches a predetermined inclination, the co-processor can activate the GPIO to deploy and/or activate another sub-system (e.g., valve control (open/close), actuator control (extend/retract), switch control (activate/deactivate), battery control (on/off), gamma control (on/off), resistivity control (on/off) pressure control (on/off) rotation control (on/off), third-party sensors (on/off), other sensors (on/off), etc.); (7) the custom application can be used to implement a dual telemetry system (e.g., an MWD system that uses both mud pulse and electromagnetic telemetry). The dual telemetry system can utilize the co-processor to translate measurements to be sent (e.g., telemetered to surface) by the electromagnetic system. The electromagnetic systems can be an add-on board, and the co-processor can be used to record directional measurements and other parameters from the MWD system, translate the measurements to the electromagnetic protocol of the electromagnetic system for transmission uphole (e.g., telemeter to the surface); and (8) the customer application can send data to the directional controller to be logged. For example, for logging data in memory of the directional controller that is available to log measurements from sensors (e.g., custom sensors, third-party sensors, etc.).

At step 840, the co-processor can transmit the output from the custom application to the processor of the directional controller. For example, processor 661 of co-processor 660 can transmit by CAN bus 670 the output from the execution of custom application 791 to processor 351 of directional controller 220. In some examples, the output can be compressed. In other examples, the output can be data specific to the custom application 791.

At step 850, the processor can receive, encode and telemeter the output to the surface. For example, processor 351 can receive the output transmitted by processor 661, can encode the output (e.g., encode, encrypt, compress, etc.) and telemeter the encoded output to the surface (e.g., to the operator of directional controller 220).

Figure 9:
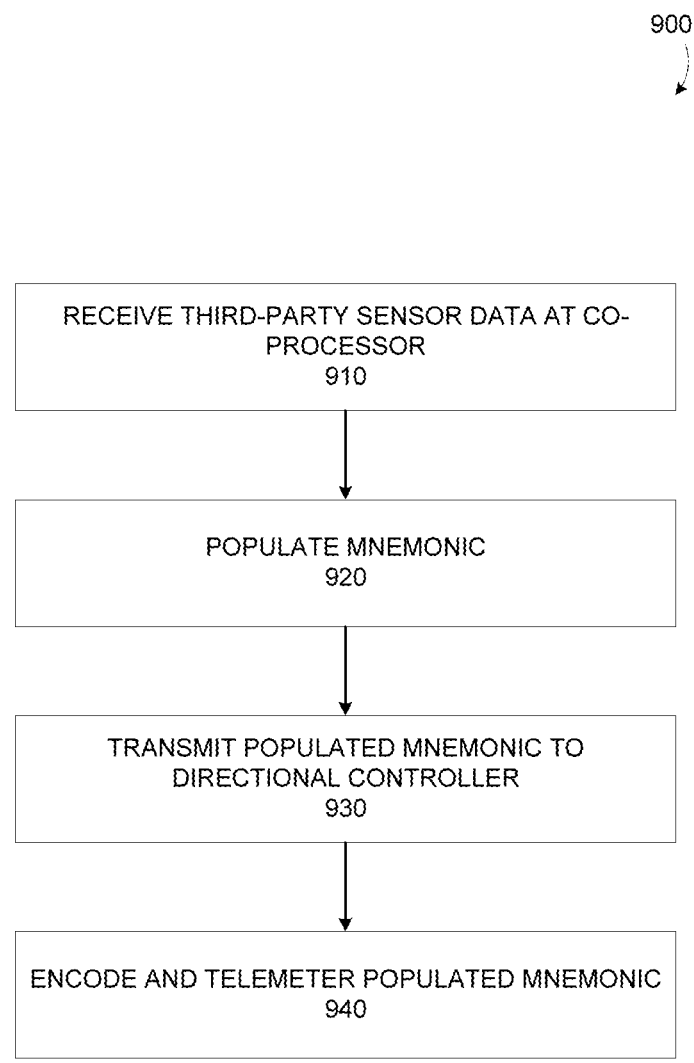
FIG. 9 illustrates a flowchart of an example method of programming an integrated MWD system with a third party sensor.

The method illustrated in FIG. 9 is provided by way of example as there are a variety of ways to carry out the method. Additionally, while the example method is illustrated with a particular order of steps, those of ordinary skill in the art will appreciate that FIG. 9 and the steps illustrated therein can be executed in any order that accomplishes the technical advantages of the present disclosure and can include fewer or more steps than illustrated.

Each step shown in FIG. 9 represents one or more processes, methods or subroutines, carried out in example method. The steps illustrated in FIG. 9 can be implemented in a system illustrated in FIG. 6 and FIG. 7.

FIG. 9 illustrates a flowchart of an example method 900 for executing a custom application. Method 900 can begin at step 910. At step 910, a co-processor can receive third-party sensor data. For example, co-processor 661 can receive from a third-party sensor (e.g., not from directional controller 220), sensor data. The third-party sensor can be communicatively coupled to processor 661 through CAN bus 670, UART bus 671 and/or RS-485 bus 672. In some examples, the third-party sensor data can be transmitted to processor 661 as an analog voltage, digital measurement, and/or current measurement. In some examples, the third-party sensors can be pressure, resistivity, spectral gamma, neutron density, azimuthal gamma, strain gauge sensor, vibration sensor, voltage, and/or current sensors.

At step 920, the co-processor can populate a mnemonic. For example, directional controller 220 can support multiple mnemonics (e.g., generic variables). The mnemonics can be used to populate (e.g., store) custom data (e.g., specific data requested by (or transmitted to) co-processor 660). For example, co-processor 660 can assign a pressure measurement to a first mnemonic, and in response to storing the pressure measurement, directional controller 220 can telemeter the first mnemonic to the surface. In another example, co-processor 660 can assign a flow measurement to the first mnemonic, a pressure measurement a second mnemonic, a temperature measurement to a third mnemonic, and a vibration measurement to a fourth mnemonic. The co-processor can perform a variety of tasks (e.g., telemeter, encode, actuate, calculate, etc.) in accordance with the execution of the custom application.

At step 930, the co-processor can transmit the populated mnemonic to the directional controller. For example, processor 661 of co-processor 660 can transmit, by CAN bus 670 (or any other transmission medium), the populated mnemonic to processor 351 of directional controller 220.

At step 940, the directional controller can receive, encode and telemeter the populated mnemonic. For example, processor 351 can receive the populated mnemonic transmitted by processor 661, can encode the populated mnemonic (e.g., encode, encrypt, compress, etc.) and telemeter the encoded populated mnemonic to the surface (e.g., to the operator of directional controller 220).

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The term "comprising", which is synonymous with "including," "containing," or "characterized by" is inclusive or open-ended and does not exclude additional, unrecited elements or method steps. "Comprising" is a term of art used in claim language which means that the named elements are present, but other elements can be added and still form a construct or method within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

The word "coupled" is defined as connected, whether directly or indirectly through intervening components, and is not necessarily limited to physical connections. The term "communicatively coupled" is defined as connected whether directly or indirectly though intervening components, is not necessarily limited to a physical connection, and allows for the transfer of data.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A subsurface drilling system comprising:
   a directional controller situated in the subsurface drilling system and comprising:

a processor; and
one or more sensors; and
a co-processor situated in the subsurface drilling system and communicatively coupled to the directional controller, the co-processor comprising a non-transitory memory storing a custom application, which when executed by the co-processor, cause the co-processor to:
receive, from the processor of the directional controller, sensor data collected from the one or more sensors;
process the sensor data according to the custom application; and
transmit, to the processor of the directional controller, an output from the custom application;
wherein, in response to receiving the output from the co-processor at the processor of the directional controller, the processor of the directional controller is configured to:
encode the output from the co-processor; and
telemeter the output to surface.

2. The system of claim 1, wherein the one or more sensors are at least one of an accelerometer, a magnetometer, and temperature sensor.

3. The system of claim 1, wherein the directional controller and co-processor are communicatively coupled by a controller area network bus.

4. The system of claim 1, further comprising:
an add-on board coupled to the co-processor, the add-on board comprising one or more third-party sensors; and
the co-processor being configured to receive, process, and transmit sensor data received from the add-on board in accordance with the custom application.

5. The system of claim 1, wherein the output is a bit stream.

6. The system of claim 1, wherein the encoding comprises compressing or encrypting the output.

7. The system of claim 1, wherein the processing the sensor data according to the custom application, further causes the co-processor to:
invoke one or more application programming interfaces; and
manipulate the sensor data according to the custom application and the invoked application programming interfaces.

8. The system of claim 7, wherein the manipulation comprises compressing the sensor data.

9. The system of claim 7, wherein the manipulation comprises comparing the sensor data to pre-defined thresholds and in response to the sensor data exceeding one of the pre-defined thresholds generating an alert as the output.

10. A programmable integrated measurement while drilling system situated in at least one barrel of a measurement while drilling string, the programmable integrated measurement while drilling system comprising:
a first processor situated in the at least one barrel and configured to receive sensor data from one or more sensors;
a second processor situated in the at least one barrel and directly connected with one or more conductors to the first processor for communicating with the first processor and configured to execute a custom application; and
a non-transitory shared memory partitioned to keep a first portion accessible by the first processor separate from a second portion accessible by the second processor, wherein the second portion storing the custom application, which when executed by the second processor, causes the second processor to:
receive, from the first processor, the sensor data;
process the sensor data according to the custom application; and
transmit, to the first processor, an output from the custom application;
wherein, in response to receiving the output from the second processor at the first processor, the first processor is configured to:
encode the output from the second processor; and
telemeter the output to surface.

11. The system of claim 10, wherein the one or more sensors are at least one of an accelerometer and a magnetometer.

12. The system of claim 10, wherein the first processor and second processor are communicatively coupled by a controller area network bus.

13. The system of claim 10, wherein the output is a bit stream.

14. The system of claim 10, wherein the encoding comprises compressing or encrypting the output.

15. The system of claim 10, wherein the execution of the custom application, further causes the second processor to:
invoke one or more application programming interfaces; and
manipulate the sensor data according to the custom application and the invoked application programming interfaces.

16. The system of claim 15, wherein the manipulation comprises compressing the sensor data.

17. The system of claim 15, wherein the manipulation comprises comparing the sensor data to pre-defined thresholds and in response to the sensor data exceeding one of the pre-defined thresholds generating an alert as the output.

18. A method of providing data from a subsurface drilling system to a surface system, the method comprising:
receiving, at a sub-surface directional controller, sensor data;
transmitting, from the subsurface directional controller to a subsurface co-processor, the sensor data;
executing, at the subsurface co-processor, a custom application, wherein the custom application processes the sensor data;
transmitting, from the subsurface co-processor to the subsurface directional controller, an output from the custom application;
encoding, by the subsurface directional controller, the output from the subsurface co-processor; and
telemetering, by the subsurface directional controller, the output to the surface system.

19. The method of claim 18, wherein the sensor data is received from an accelerometer, magnetometer, or a temperature sensor.

20. The method of claim 18, wherein the executing the custom application further comprises:
invoking one or more application programming interfaces; and
manipulating the sensor data received from the subsurface directional controller according to the custom application and the invoked application programming interfaces.

21. A high temperature customizable downhole tool comprising:
a first downhole processor configured to operate in real-time;
one or more sensors coupled to the first downhole processor and configured to record and send sensor data to the first downhole processor;

a second downhole processor directly coupled with one or more conductors to the first downhole processor for communicating with the first downhole processor;
a non-transitory memory coupled to the second downhole processor, the non-transitory memory configured to store a custom application;
the second downhole processor configured to execute the custom application, which causes the second downhole processor to:
  receive, from the first downhole processor, the sensor data;
  process the sensor data to determine an output; and
  transmit the output to the first downhole processor;
wherein the first downhole processor, in response to receiving the output from the second downhole processor, is configured to encode the output and telemeter the output to surface.

* * * * *